United States Patent [19]
Kakuta

[11] Patent Number: 5,179,838
[45] Date of Patent: * Jan. 19, 1993

[54] APPARATUS FOR DRIVING TURBO SUPERCHARGER

[76] Inventor: Yoshiaki Kakuta, 1-8-1, Hamakawado, Kasukabe-Shi, Saitama-Ken, Japan

[*] Notice: The portion of the term of this patent subsequent to May 26, 2009 has been disclaimed.

[21] Appl. No.: 634,336

[22] Filed: Dec. 26, 1990

[30] Foreign Application Priority Data

Dec. 28, 1989 [JP] Japan .................. 1-342769

[51] Int. Cl.⁵ .............................................. F02B 33/44
[52] U.S. Cl. .................................. 60/605.1; 60/316; 60/324; 60/614; 60/612
[58] Field of Search ............ 60/605.1, 614, 316, 60/319, 324, 280, 612

[56] References Cited

U.S. PATENT DOCUMENTS

| | | | |
|---|---|---|---|
| 4,418,532 | 12/1983 | Momose et al. | 60/316 |
| 4,548,039 | 10/1985 | Dinger et al. | 60/612 |
| 4,864,825 | 9/1989 | Kakuta | 60/319 |
| 4,905,633 | 3/1990 | Kakuta | 123/41.62 |
| 4,909,034 | 3/1990 | Kakuta | 60/324 |
| 4,926,638 | 5/1990 | Kakuta | 60/319 |

FOREIGN PATENT DOCUMENTS 2338382 12/1977 France .

*Primary Examiner*—Richard A. Bertsch
*Assistant Examiner*—Charles G. Freay
*Attorney, Agent, or Firm*—Jacobson, Price, Holman & Stern

[57] ABSTRACT

An apparatus for driving a turbo supercharger (6) of an internal combustion engine (1) including an exhaust gas driven turbine (61) driving a compressor (62) for pressurizing engine intake air wherein a gas suction duct (10) is connected to the outlet (8) of the exhaust gas turbine (61), through which the exhaust gas flowing through the turbine is discharged, thereby sucking the exhaust gas discharged from the turbine and driving the turbine by simultaneous positive and negative pressures. The suction force is produced by a negative pressure generator (5) provided in the exhaust gas conduit (2) downstream of the exhaust gas turbine outlet.

4 Claims, 6 Drawing Sheets

APPARATUS FOR DRIVING TURBO SUPERCHARGER

BACKGROUND OF THE INVENTION

1. Field of the Invention

The present invention relates to an apparatus for driving a turbo supercharger at high efficiency in an internal combustion engine.

2. Description of the Prior Art

A system or an apparatus for rotating an exhaust gas turbine by exhaust gas energy to drive a supercharger and prepressurizing suction gas is known Recently, such systems have been frequently employed in automotive engines.

The conventional turbo supercharger normally employs only one stage of a centrifugal turbine to convert kinetic energy produced by feeding part or all of exhaust gas discharged from the combustion chamber of an engine to an exhaust gas turbine, into rotary motion as the power of the supercharging compressor. The supercharging turbine prepressurizes intake gas and charges vaporized fuel enhanced in its density to a combustion chamber.

In the conventional system, the following problems arise:

1) There is a time lag until a turbo effect is exhibited.
2) Since it is driven only by a positive pressure, its criterion is low and the capacity of the turbine cannot be sufficiently produced.
3) Since prepressurized intake gas is superheated by high temperature equipment, its density is low and its charging efficiency is deteriorated.
4) Since it is driven only by high temperature exhaust gas, the equipment becomes heated to an extremely high temperature which is dangerous.
5) Engine overheating rate is high.

In view of discussions of these factors, the time lag in the above paragraph 1) is considered to result from the fact that, the turbine is rotated at a low speed in the initial operation, and the exhaust gas pressure (back pressure) is insufficient and therefore the starting torque of the exhaust gas turbine is insufficient. The problem in the above paragraph 2) is considered to be that only one direction of the exhaust gas flow acts on the turbine. When the exhaust gas turbine is driven by the exhaust gas energy, the accuracy of the turbine blades is affected, irregular speed distribution and surging occur, and the exhaust gas discharging efficiency after passing the turbine is remarkably reduced by the long duct of an exhaust gas system, catalyst, a silencer, etc. The problem in the above paragraph 3) is considered to be that, particularly in the case of a gasoline engine, decrease in the average effective pressure (Pm) is strongly affected due to the reduction in the air density due to high temperature exhaust gas to cancel the boosting effect. Cooling of suction gas is required to cope with the decrease in the air density. The overheat occurs when the entire engine tends to be constantly overheated, and the influence of the circulated heat of the exhaust gas and the retained heat due to low discharge efficiency are considered.

As results of the above discussions, the present inventor has repeatedly studied the advantages of driving a supercharger with exhaust gas energy. Then, a conclusion has been reached that the driving system is malfunctioned only by the kinetic energy of the exhaust gas flow outputted from a combustion chamber. One of the reasons is that, if the exhaust gas energy at high speed exceeding a sonic speed can be utilized, the problem can be relatively reduced, but since large load resistance is incorporated at the rear in fact, the energy cannot be sufficiently utilized. In other words, if the exhaust gas efficiency is equivalent to that in a system having no other resistances such as catalyst, silencer, etc., this problem can be solved. If the exhaust gas efficiency can be improved. the problem of the heat retention can be alleviated, and the overheating problem can be eliminated.

SUMMARY OF THE INVENTION

The present invention has been accomplished with such circumstances in view. It is an object of the present invention to provide an apparatus for driving a turbo supercharger which can positively drive an exhaust gas turbine by exhaust gas flow not substantially affected by a load resistance, simultaneously suck the exhaust gas flow passing through the turbine by a sucking gas flow at low pressure, and simultaneously negatively drive the turbine to remarkably enhance the exhaust gas discharge efficiency.

Thus, discharge efficiency equivalent to or higher than that in an exhaust gas system having no load resistance is obtained in the vicinity of the supercharger.

In order to achieve the above object, there is provided according to the present invention an apparatus for driving a turbo supercharger having a turbine inlet for introducing exhaust gas flow exhausted at high speed from a combustion chamber of an internal combustion engine, an exhaust gas turbine to be positively driven by the exhaust gas flow introduced from the inlet and a supercharging compressor to be operated by the exhaust gas turbine, comprising a negative pressure generator provided in an exhaust gas conduit for discharging the exhaust gas flow including exhaust gas flow passing the exhaust gas turbine into the atmosphere for accelerating the exhaust gas flow to form a strong negative pressure as a high speed gas flow, a suction passage provided between the suction chamber of the generator and the exhaust gas conduit at a position upstream of the generator and at a position downstream of the exhaust gas turbine outlet for sucking the exhaust gas flow passing through the exhaust gas turbine by negative pressure.

The suction gas flow accelerates the exhaust gas flow, thereby preferably using the negative pressure generated as driving power. The negative pressure may be formed by utilizing the electric power or the rotation of the shaft, but this again remarkably reduces the output of the engine.

According to the present invention, the positive pressure of the exhaust gas passing through the turbo supercharger is not excessively increased, the rotating speed is remarkably accelerated, and the speed of the intaken air passing through the supercharging compressor is remarkably accelerated. As a result, since the heat of the supercharging compressor is removed at a high speed by the gas flow passing through the compressor at high speed, the supercharger and the peripheral temperature are not overheated, but the engine intake gas temperature is relatively reduced. Therefore, the air density is increased, and means for increasing charging efficiency is provided in this respect.

BRIEF DESCRIPTION OF THE DRAWINGS

These and other objects and features of the present invention will become apparent from the following detailed description with reference to the accompanying drawings wherein.

DESCRIPTION OF THE PREFERRED EMBODIMENTS

Figure 1:
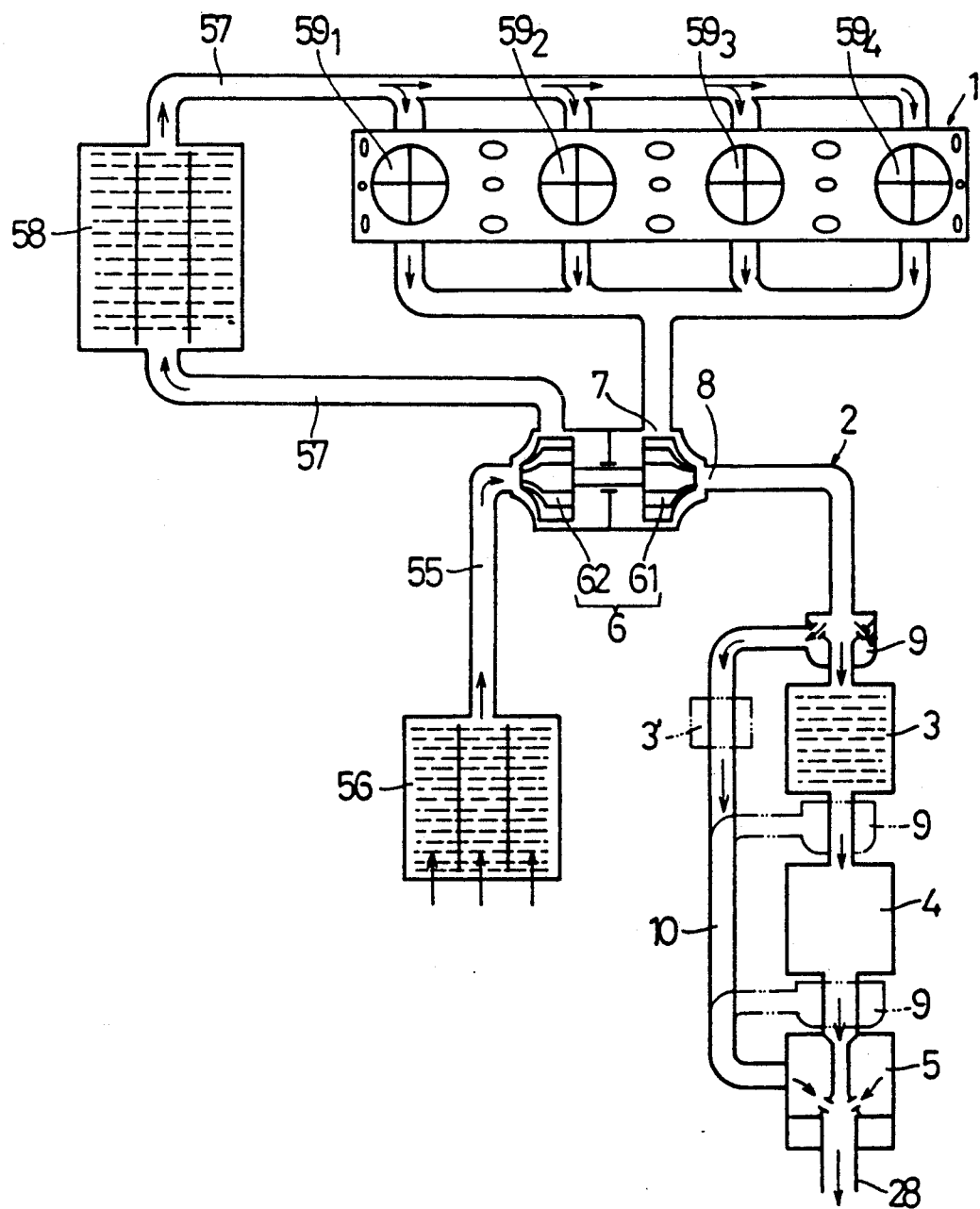
FIG. 1 is a schematic view of a first embodiment of a driving apparatus according to the present invention.

An entire concept of an apparatus for driving a turbo supercharger according to the present invention is shown in FIG. 1. A turbo supercharger 6 is shown as a normal type in which an exhaust gas turbine 61 is coupled with a supercharging compressor 62 via a shaft, positively driven by engine exhaust gas and simultaneously negatively driven by suction gas flow produced by exhaust gas flow acceleration.

In FIG. 1, a gasoline engine 1, an exhaust gas conduit 2, a catalyst unit 3 for purifying exhaust gas, an exhaust gas muffler 4, a negative pressure generator 5, and a turbo supercharger 6 are provided. Exhaust gas flow is fed from a turbine inlet 7 disposed in the exhaust gas conduit 2 immediately after the combustion chambers to a turbine outlet 8 immediately after the exhaust gas turbine. Sucking means 9 sucks the exhaust gas flow passing through the exhaust gas turbine 61. One or more sucking means 9 are provided in the exhaust gas conduit 2 between the turbine outlet 8 and the negative pressure generator 5, and the sucking means 9 are connected to the suction chamber of the negative pressure generator 5 by a suction passage 10. In the present invention, the suction means 9 may be connected at any position to the exhaust gas conduit 2 downstream of the turbine 61 (dotted broken line in FIG. 1), but the present invention particularly resides in that it is provided immediately before the upstream end of the negative pressure generator 5. This is because, in addition to the shortening of the suction passage 10, reaccelerating suction effect is large at the downstream end due to large deceleration of the speed. It is apparent that the exhaust gas conduit 2, the catalyst unit 3 and the muffler 4 form main load resistances of the exhaust gas conduit 2. When the sucking means 9 are provided in the exhaust gas conduit 2 upstream of the catalyst unit 3, another catalyst unit 3' is newly provided in the suction passage 10.

Figure 2:
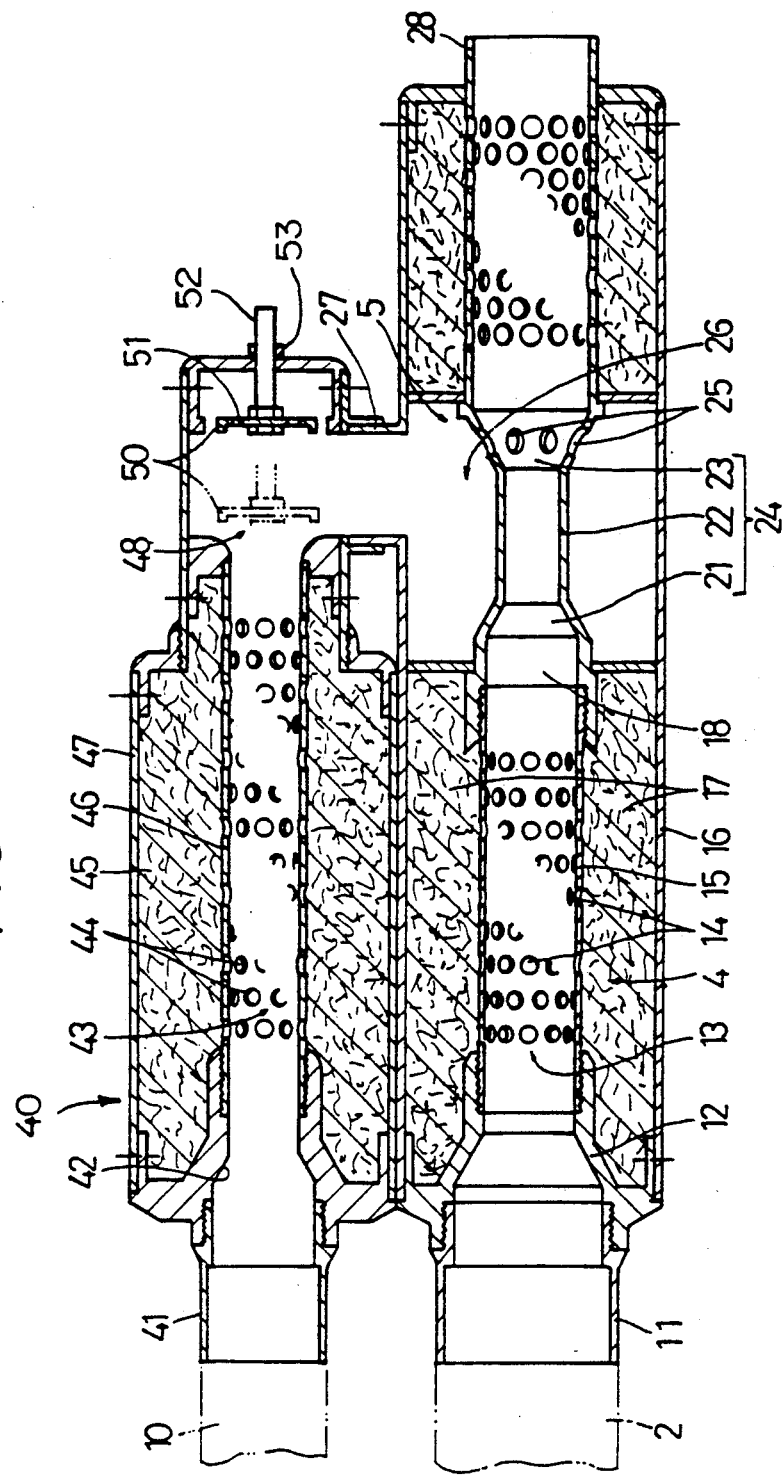
FIG. 2 is a longitudinal cross-sectional view of a negative pressure generator.

The exemplified negative pressure generator 5 reaccelerates the exhaust gas flow immediately before the discharge of the exhaust gas into the atmospheric air, and the negative pressure formed thereby is utilized as suction energy. The muffler 4 is, as shown in FIG. 2, connected to the exhaust gas conduit 2, at front end 11 providing a main passage 13 at the central portion reduced in diameter with a tapered entrance portion 12 and is filled with a silencing material 17 between the outer periphery of the central cylinder 15 having vent holes 14 at the peripheral surface with and an outer cylinder 16. The downstream end of the central cylinder 15 is connected to an acceleration portion, and the exhaust gas flow is effected by silencing action and fed from a main passage outlet 18 to the negative pressure generator 5.

Figure 3:
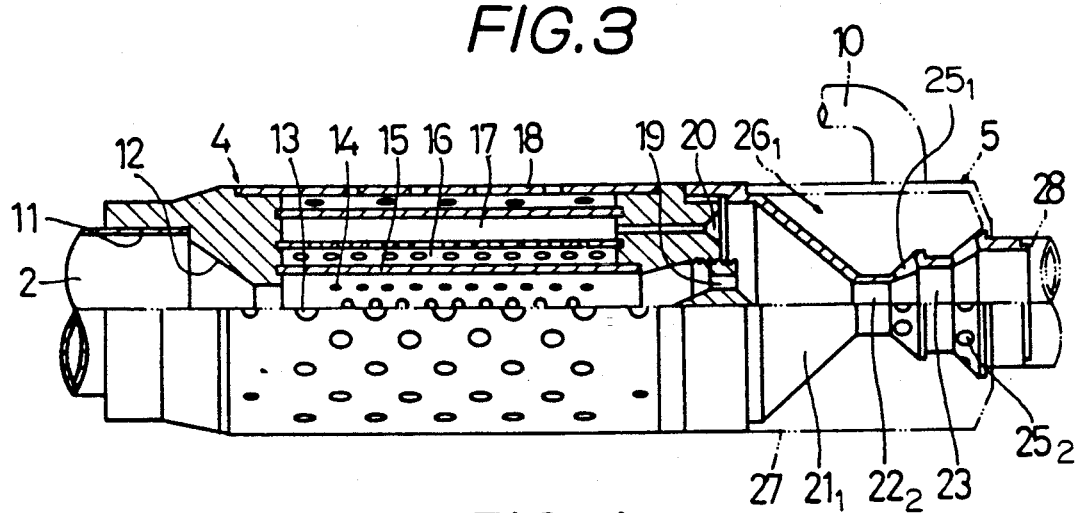
FIG. 3 is a longitudinal cross-sectional view of a 2-stage acceleration type negative pressure generator.

The negative pressure generator 5 is disposed downstream of the load resistances, and has a throttle tube 21 connected to the outlet 18, and an accelerator 24 having said throttle tube 21, a throat tube 22 and an expansion tube 23 for further accelerating the exhaust gas flow in multi-stages to form a strong negative pressure, thereby forming negative pressure in a suction chamber 26 communicating with an air inlet 25 formed immediately after the accelerator 24 to suck the air flow through a connecting tube 27 to the rear of the outer cylinder surrounding it. The accelerator may have two or more stages. The volume $V_1$ of the accelerator throat tube 22 is set to a volume necessary to throttle the exhaust gas flow to the minimum at the throttle tube 21 to obtain a primary acceleration flow. In the case of the example of multi-stage accelerations shown in FIG. 3, the volume $V_2$ of a second throat tube 23 to the volume $V_1$ of a first throat tube $22_2$ satisfies $V_2 = AV_1$ (A=2). Of course, this coefficient A may take another arbitrary numeric value. The inner diameter of a tail tube 28 may preferably be the inner diameter or more of the final accelerator. The air inlets 25, $25_1$, $25_2$ are preferably formed with forwarding angle $\theta$, and this angle $\theta$ is larger than "0" and less than "90 degrees", and preferably in the range from 10 to 45 degrees.

Figure 4:
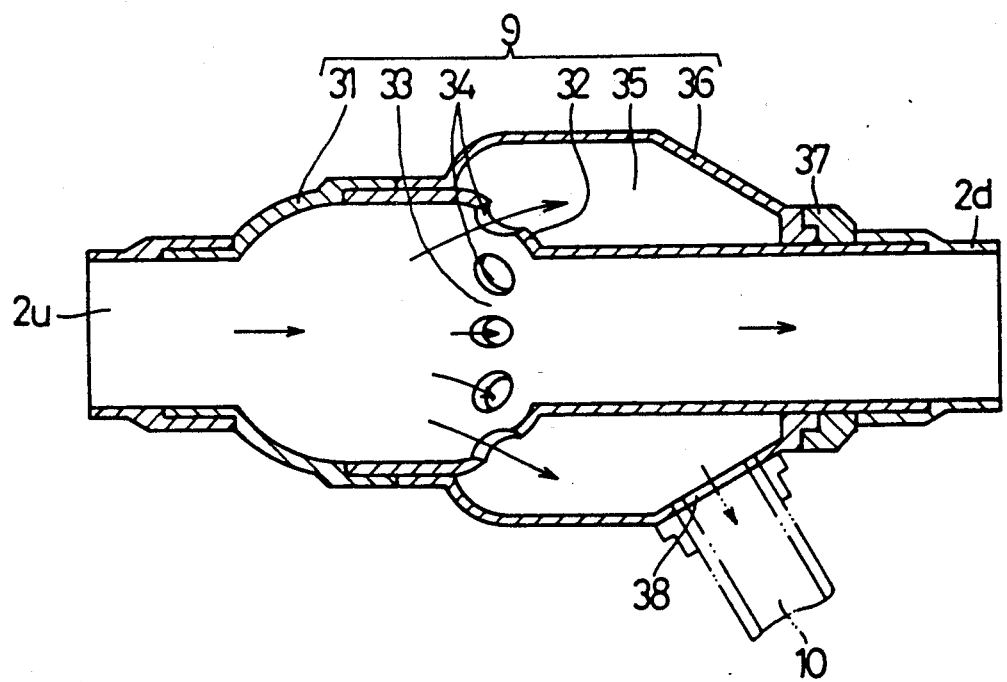
FIG. 4 is a longitudinal cross-sectional view of sucking means.

The exhaust gas flow is sucked by the high negative pressure formed by the negative pressure generator 5 constructed as described above from the outlet 8 of the exhaust turbine 61 through the suction passage 10. The sucking means 9 and a suction side muffler 40 (FIG. 2) to be described later are provided to accelerate the exhaust gas flow downstream of the outlet 8. The sucking means 9 has, as shown in FIG. 4, an expansion tube 31 connected at its upstream end to part $2u$ of the exhaust gas conduit 2, a throttle tube 32 reduced in diameter again, a suction port 34 open at the tapered throttle 33 of the tube 32, and connecting means 37 connected to a sucking chamber member 36 formed with a sucking chamber 35 for covering the outer periphery of the throttle tube 32 including suction ports 34 and the downstream part $2d$ of the exhaust gas conduit 2 for sucking the turbine exhaust gas from outside. The suction passage 10 is connected to the suction chamber member 36 at the connection ports 38. The suction port 34 are disposed outside the exhaust gas flow so as to effectively suck and exhaust the exhaust gas flow to be exhausted from the exhaust gas turbine 61.

The above-mentioned suction side muffler 40 silences the exhaust gas flow sucked and fed into the suction chamber 26 through the end of the suction passage 10, controls the flow rate of the exhaust gas flow, and has a connection port 41 to the suction passage 10, a tapered portion 42, a central passage 43, silencing holes 44, silencing material 45 between an outer cylinder 47 and a central cylinder 46, a control chamber 48 at the end of the central cylinder 46, and a movable valve 50 for regulating the exhaust gas flow rate to be sucked through the connecting tube 27 to the suction chamber 26 as described above. The muffler 40 further has small holes 51 in the movable valve 50, a movable valve mounting shaft 52 and a coaxial support 53 for the shaft 52.

In the embodiment in FIG. 1 are further provided, an air intake tube 55 for sucking air to the supercharging compressor 62, an air cleaner 56 provided therein, a suction air tube 57 for feeding pressurized air from the compressor 62 to the suction ports, an inter-cooler 58 provided in the suction tube 57 for feeding intake air to combustion chambers $59_1$, $59_2$, $59_3$, $59_4$, .. as mixture gas mixed by fuel supply means (not shown) such as a fuel injection unit or carburetor, etc.

Figure 5:
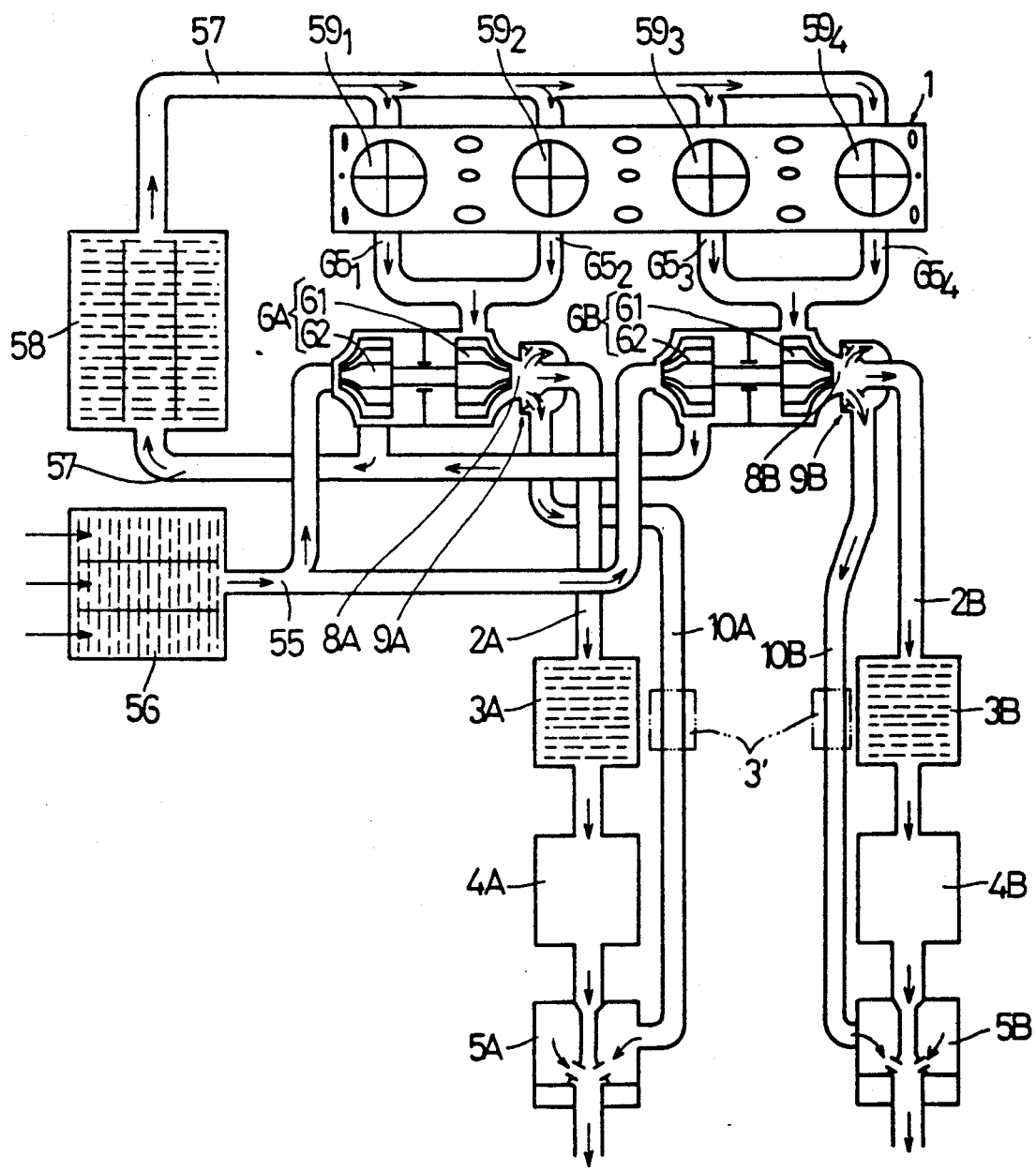
FIG. 5 is a schematic view of a second embodiment of a driving apparatus according to the present invention.

FIG. 5 shows a second embodiment of the present invention. Exhaust gas tubes $65_1$, $65_2$, $65_3$, $65_4$ of four-cylinder engine 1 are gathered into two groups, and two turbo superchargers 6A and 6B are respectively driven by the groups. Thus, the exhaust gas system is divided into two system tubes 2A and 2B. Accordingly, exhaust gases discharged from the first and second combustion chambers $59_1$ and $59_2$ are, for example, fed to drive the first turbo supercharger 6A by the first and second exhaust gas tubes $65_1$ and $65_2$, to be then accelerated through the first exhaust gas conduit 2A by the first negative pressure generator 5A and discharged into the atmosphere. Then, the exhaust gases discharged from the third and fourth combustion chambers $59_3$ and $59_4$ are fed to drive the second turbo supercharger 6B by the third and fourth exhaust gas tubes $65_3$ and $65_4$, to be then accelerated through the second exhaust gas conduit 2B by the second negative pressure generator 5B and discharged into the atmosphere.

Figure 6:
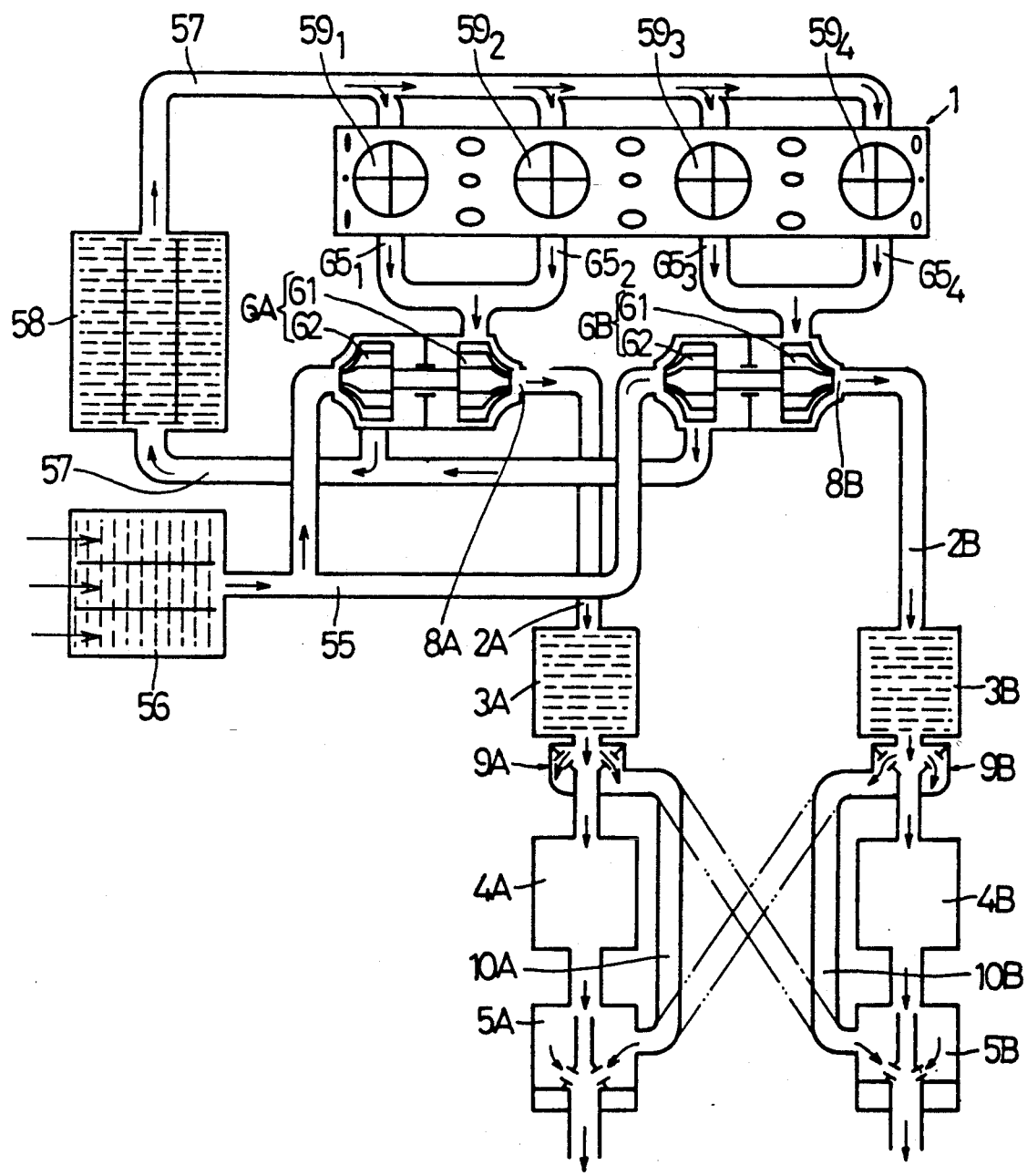
FIG. 6 is a schematic view of a modification of the second embodiment.

FIG. 6 shows a modified example of the second embodiment. In order to drive the turbo supercharger 6 under negative pressure, sucking means is provided in the vicinity of the downstream end of each exhaust gas conduit. Sucking means 9A and 9B are provided immediately after catalyst units 3A and 3B. The other arrangement of the third embodiment is the same as that of the second embodiment, and the description thereof will be omitted with the same reference numerals designated. The exhaust gases exhausted from the combustion chambers may be entirely introduced into the exhaust gas turbine 61, or partly utilized, or switched between the entirety and the part.

First and second sucking means 9A and 9B are disposed after the turbine outlet 8A of a first turbo supercharger 6A and the turbine outlet 8B of a second turbo supercharger 6B, and negative pressures for driving the sucking means 9A and 9B are generated by negative pressure generators 5A and 5B. If there is a difference between the exhaust gas energy by the first and second combustion chambers $59_1$ and $59_2$ and the exhaust gas energy by the third and fourth combustion chambers $59_3$ and $59_4$ in such a manner that the former is larger than the latter, the positive pressure for driving the second turbo supercharger 6B is smaller than that of the first turbo supercharger 6A, and the negative pressure generated by the first negative pressure generator 5A becomes larger than that of generator 5B. In such a case, when the suction passages 10A, 10B are crossed as shown by dotted broken lines in FIG. 6 to be connected to the opposite turbine, the second turbo supercharger 6B is driven by the larger negative pressure as well and the first turbo supercharger 6A is driven by the smaller negative pressure as well, thereby averaging them.

The way of gathering the exhaust gas tubes $65_1$ to $65_4$ is not limited to the above embodiment. For example, they can be suitably combined such that the first and fourth combustion chambers $59_1$ and $59_4$, and the second and third combustion chambers $59_2$ and $59_3$ are respectively combined. For example, they may be set by considering the sequence of ignitions of the combustion chambers. The air intake tube 55 communicating with the supercharging compressor 62 of the turbo superchargers have only one air cleaner 56 and the suction tube 57 communicating with the combustion chambers from the supercharging compressor outlets has only one inter-cooler 58. However, they may be, of course, divided into two systems.

Figure 7:
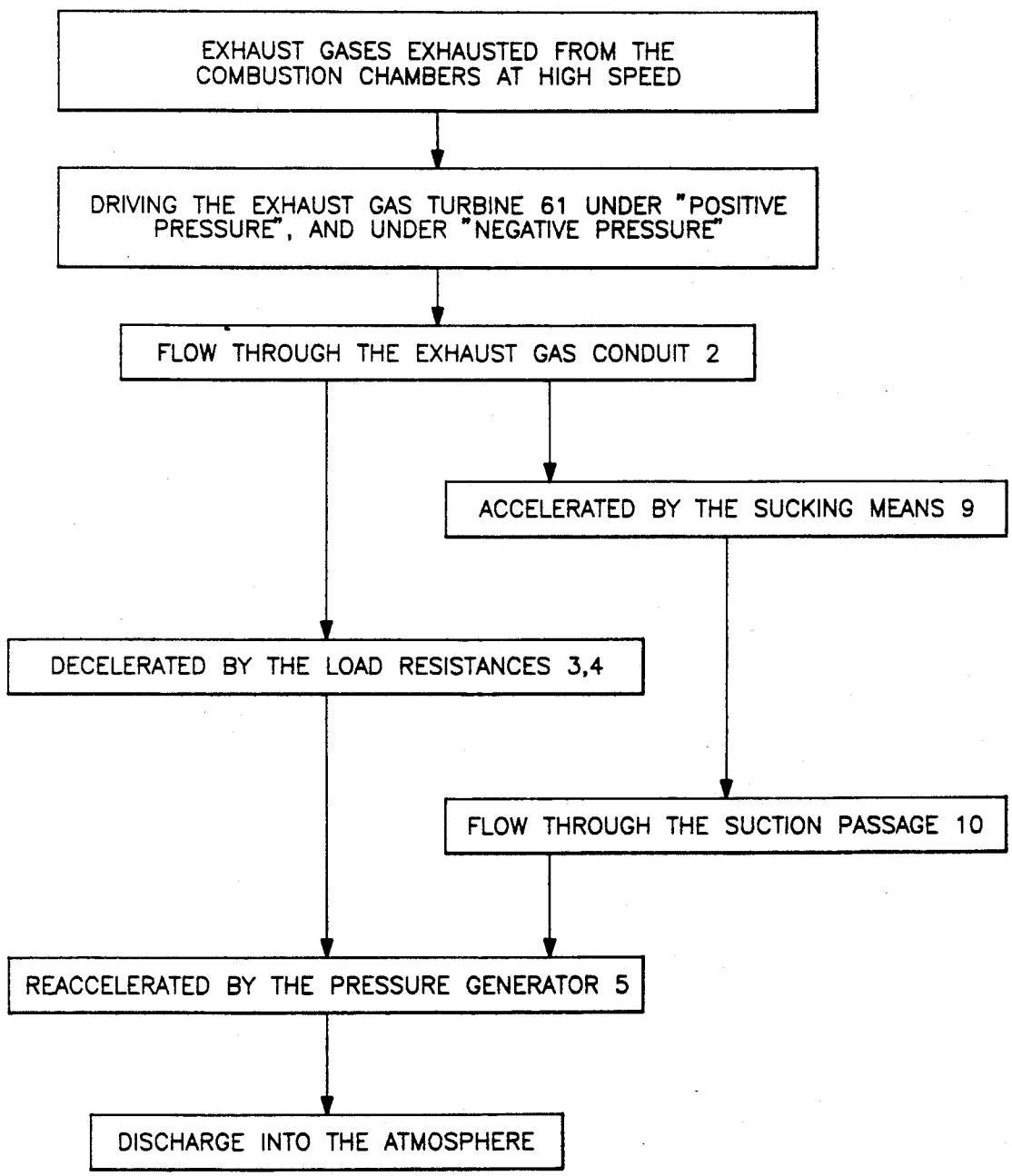
FIG. 7 is a flow chart showing exhaust gas flow and operation of the invention.

In summary of the descriptions of the apparatus for driving the turbo superchargers, it is understood that the exhaust gases are fed and the system operates as shown in the flow chart of FIG. 7..

According to the present invention in the arrangement as described above, the turbo supercharger 6 is positively driven by so-called "pressing" pressure of the exhaust gas flow, and simultaneously driven under negative pressure to be effected by suction. Therefore, since the exhaust gas itself for positively driving the exhaust gas turbine 61 is always sucked, the exhaust gas efficiency of the exhaust gas conduit is remarkably enhanced to a much higher stage. In other words, the exhaust gas turbine 61 to be driven only by the strong negative pressure formed by the negative pressure generator is simultaneously effected by the pressing of the existing exhaust gas flow.

As a result, according to the present invention, the exhaust gas turbine 61 is driven by both the driving forces in the pressing and the sucking directions. Therefore, in comparison with the conventional exhaust gas turbine driven only by pressing pressure, the rotating speed is remarkably enhanced. Since the sucking means 9 is provided in the vicinity of the discharge unit into the atmospheric air, the speed of the exhaust gas flow remarkably decelerated can be significantly reaccelerated.

Since the one turbine 61 is simultaneously driven by the positive and negative pressures, its starting characteristic is improved, and its rising curve has approximated to a linear relation. Such simultaneous actions of both the positive and negative pressures to the turbine can enhance the supercharging pressure as compared with the conventional one even without high accuracy and high performance of the turbine blades, and means to improve the starting characteristic.

The drive of the exhaust gas compressor 61 reflects the rotating characteristic of the supercharging turbine 62 and the operation thereof. In other words, since the suction pressure is linearly enhanced, the charging efficiency is remarkably improved.

As a result of the combustion being advanced by the high charging efficiency, it may seem to appear that the exhaust gas temperature is raised. However, as described above, the exhaust gas flow is accelerated, intake air flow is accordingly accelerated, and the heat is removed at a high speed. Therefore, retention of the heat scarcely occurs, the temperature of the periphery of the engine is not remarkably raised, but on the contrary, is lowered as compared with the conventional turbo.

Consequently, according to the present invention, the following effects can be expected.

1) A time lag of the turbo effect is greatly shortened.
2) Since the turbine is driven by both the positive and negative pressures, the rotating speed is remarkably enhanced to sufficiently utilize the performance of the turbine.

3) Since heat retention is remarkably reduced by the acceleration of the exhaust gas flow to thereby decrease the suction temperature, the density of the intake air is enhanced to improve charging efficiency.
4) The temperature around the device is reduced correspondingly to the reduction in the heat retention.
5) The turbo does not cause the engine to be overheated.

According to the present invention as described above, the performance of the turbo supercharger is remarkably enhanced, and the intake gas temperature to be supercharged is reduced.

I claim:

1. An apparatus for driving a turbo supercharger for an internal combustion engine having at least one combustion chamber, an inlet and an outlet for said at least one combustion chamber, and an exhaust gas conduit having an upstream end connected to said at least one combustion chamber outlet and a downstream end, comprising:
   an exhaust gas turbine having an inlet and an outlet;
   a supercharging compressor connected to said exhaust gas turbine to be driven thereby and having an inlet and an outlet;
   said exhaust gas turbine inlet being connected to said exhaust gas conduit downstream of said at least one combustion chamber outlet so that said exhaust gas turbine is positively driven by the exhaust gas flow in said exhaust gas conduit;
   a downstream portion of said exhaust gas conduit disposed between said exhaust gas turbine and said downstream end of said conduit and having an upstream end connected to said exhaust gas turbine outlet;
   a negative pressure generator in said portion of said exhaust gas conduit downstream of said exhaust gas turbine outlet so that exhaust gas flows through said negative pressure generator;
   a discharger outlet in said negative pressure generator for discharging exhaust gas flowing therethrough to the atmosphere;
   gas accelerating means in said negative pressure generator for accelerating the exhaust gas flow to produce a strong negative pressure;
   a suction chamber in said negative pressure generator communicating with said gas accelerating means so that said gas accelerating means produces a negative pressure in said suction chamber;
   a suction duct having a downstream end connected to said suction chamber and an upstream end connected to said portion of said exhaust gas conduit downstream of said exhaust gas turbine outlet and upstream of said negative pressure generator for sucking exhaust from said exhaust gas turbine outlet through said suction chamber; and
   intake air conduit means having a first portion connected to said supercharging compressor inlet and a second portion connected between said supercharging compressor outlet and said at least one combustion chamber inlet, so that said exhaust gas turbine is driven positively by said exhaust gas pressure flowing through said exhaust gas conduit and by said negative pressure generated in said negative pressure generator for driving said supercharging compressor to supercharge intake air to said at least one combustion chamber.

2. An apparatus as claimed in claim 1 and further comprising:
   further suction means connected to said portion of said exhaust gas conduit between said exhaust gas turbine outlet and said negative pressure generator and having further accelerating means therein for accelerating said exhaust flow and producing further suction; and
   outlet means for said further suction means connected to said upstream end of said suction.

3. An apparatus as claimed in claim 1, wherein:
   said internal combustion engine comprises a plurality of combustion chambers;
   at least two separate exhaust gas conduits are provided for said combustion chambers;
   a separate exhaust gas turbine is provided in each of said at least two exhaust gas conduits for driving a respective supercharging compressor connected thereto;
   separate inlets for each supercharging compressor are connected to a first portion of said intake air conduit means;
   separate outlets for each supercharging compressor are connected to a second portion of said intake air conduit means, said second portion of said intake air conduit means being connected to inlets of said at least two combustion chambers;
   separate downstream portions of said exhaust gas conduits each have an upstream end connected to an outlet of each respective exhaust gas turbine;
   a separate negative pressure generator is provided in each respective downstream portion of said exhaust gas conduits downstream of said exhaust gas turbines;
   a separate suction chamber is provided for each separate negative pressure generator; and
   separate suction ducts are connected between each suction chamber of each negative pressure generator and respective downstream portions of said exhaust gas conduits upstream of respective negative pressure generators.

4. An apparatus as claimed in claim 3 and further comprising:
   a first interconnecting suction conduit connecting said suction chamber of one of said negative pressure generators to said downstream portion of said exhaust gas conduit upstream of the other of said negative pressure generators; and
   a second interconnecting suction duct connecting said suction chamber of said other negative pressure generator to said downstream portion of said exhaust gas conduit upstream of said one negative pressure generator.

* * * * *